UNITED STATES PATENT OFFICE.

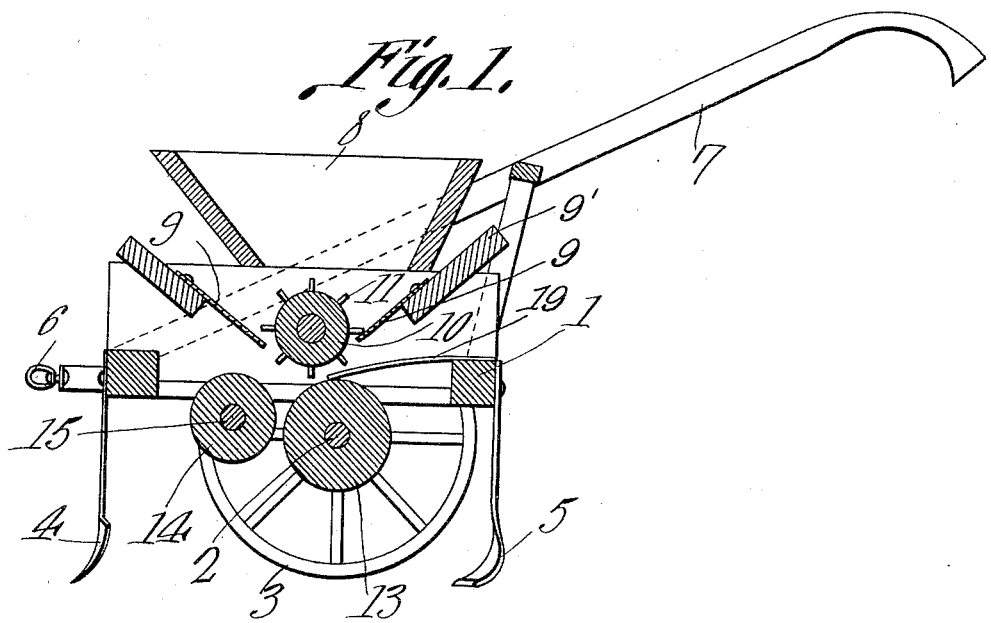
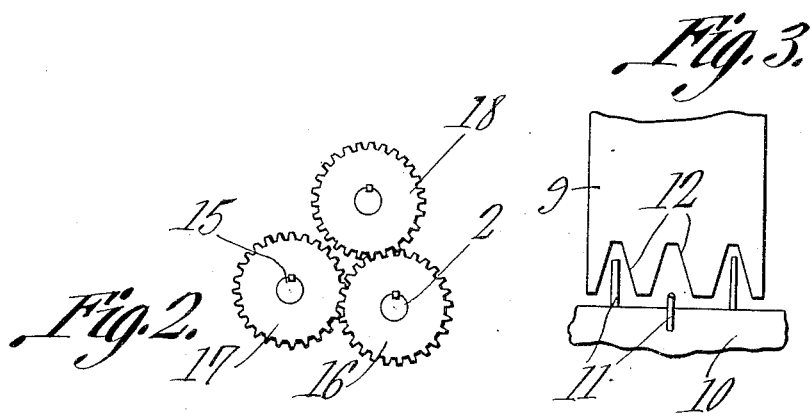

JOHN A. GARDNER, OF GRIFTON, NORTH CAROLINA, ASSIGNOR OF ONE-HALF TO J. R. SMITH AND BRO., OF AYDEN, NORTH CAROLINA.

SEED-CRUSHER.

1,097,420. Specification of Letters Patent. Patented May 19, 1914.

Application filed December 28, 1910. Serial No. 599,768.

*To all whom it may concern:*

Be it known that I, JOHN A. GARDNER, a citizen of the United States, residing at Grifton, in the county of Pitt and State of North Carolina, have invented a new and useful Seed-Crusher, of which the following is a specification.

This invention relates to a cotton seed crusher and dropper and consists in the novel construction and arrangement of its parts as hereinafter described and claimed.

The object of the invention is to provide a device of the character indicated which is adapted to be used for crushing the seed to such an extent that its life is destroyed but not to such an extent as to convert the same into mass or dry material deprived of its nourishment. The seed thus crushed are deposited in the soil below the surface of the same and thus the albumen and other nourishing elements of the seed are taken up by the soil or retained in the same so that other seed which is planted in the soil may derive nourishment from the crushed particles of the seed previously deposited therein.

In the accompanying drawing:—Figure 1 is a longitudinal sectional view of the cotton seed crusher and dropper. Fig. 2 is a side elevation of a train of gear wheels used upon the same. Fig. 3 is a plan view of a portion of the cotton seed crusher and dropper.

The seed crusher and dropper consists of a frame 1 mounted upon an axle 2 which in turn is mounted upon ground wheels 3. A furrow opener 4 is located at the forward portion of the frame 1 and furrow closers 5 are located at the rear portion of the said frame. A clevis 6 is connected with the forward portion of the frame 1 and handles 7 are mounted upon the said frame. A hopper 8 is mounted upon the frame 1 and two recessed plates 9, carried by the inclined front and rear boards 9', form portions of the bottom of the said hopper and are in synclinal relation to each other spaced apart at their lower edge portion. A roll 10 is journaled for rotation in the lower portion of the hopper 8 and projects through the space between the lower edges of the plates 9. The roll 10 is provided upon its periphery with fingers 11 which are adapted to pass through the recesses 12 provided at the lower edges of the said plates 9. A roll 13 of relatively great diameter is fixed to the intermediate portion of the axle 2 below the roll 10 and a roll 14 is fixed to a shaft 15 which is journaled to the frame 1. The roll 14 is of relatively small diameter and the said roll is located in advance of the roll 13. The roll 14 is also located below the roll 10 but the axis of the roll 14 is slightly elevated with relation to the axis of the roll 13. The peripheries of the rolls 13 and 14 are slightly spaced apart for the purposes hereinafter explained. A gear wheel 16 is fixed to the axle 2 and meshes with a gear wheel 17 which is fixed to the shaft 15. A gear wheel 18 is fixed to the shaft of the roll 10 and meshes with the gear wheel 16. The gear wheels 16, 17 and 18 are of the same diameter. By reason of the fact that the gear wheels 16, 17 and 18 are of the same diameter and intermesh as indicated, they move at their peripheries at a uniform rate of speed but by reason of the fact that the roll 13 is of greater diameter than the rolls 10 and 14, the said roll 13 at its periphery moves at a faster rate of speed than do the peripheries of the rolls 10 and 14.

A resilient plate 19 is supported at the rear of the frame 1 and has its free end projected beyond the end of the rear plate 9 and rest upon the roll 13, and thus assists in directing the seed to and between the rolls 13 and 14.

In operation the seed is placed in the hopper 8 and is permitted to gravitate upon the upper portion of the roll 10. As the machine is drawn along the surface of the ground, the opener 4 will open a furrow in the soil and as the wheels 3 rotate the axle 2 rotary movement is transmitted through the train of gears 16, 17, and 18 to the rolls 10 and 14 and the roll 13 rotates in unison with the axle 2. As the upper portion of the roll 10 turns in a rearward direction, the pins 11 engage the seed and tend to tear the same apart as the said pins pass through the recess 12 provided in the rearmost plate 9. The seed thus passed below the bottom of the hopper is delivered into the space between the rolls 13 and 14 and the said rolls engage the said seed and pass the same down so that the seed may fall into the furrow opened by the furrow opener 4. The furrow closers 5 will cast the soil over the seed thus deposited and thus the seed is covered in the ground. By reason of the fact that the rolls 13 and 14 are slightly spaced apart the said rolls will receive between them the seeds and crush the seeds to such an extent that the life of the seed is destroyed but the seed is not squeezed into a mat or tape whereby its contents in the form of moisture may evaporate or escape. Again the gear wheels which constitute the train that operatively connects the axle 2 with the shafts of the rollers 10 and 14 are of the same diameter, while the roller 13 is of greater diameter than the roller 14. Consequently the said roller 13 will move faster at its periphery than will the periphery of the roller 14 and thus the seed that is passed between the said rollers is rolled between them and this rolling action more effectually crushes the seed to destroy the life therein without reducing the seed to a mass crushed to an undesirable extent. The seed thus deposited in the ground serves to fertilize to the advantage of crops planted subsequently.

The cardinal or salient feature of the present invention resides in the provision of the slightly inclined plate 19 carried by the frame and having its free portion resting on top of one of the horizontally juxtaposed crushing rollers, in connection with the toothed feed roller carried by the frame above the free portion of the said plate and coöperating with the said plate and roller, and the respective inclined plate 9 carried by the frame above the plate 19 and having its lower portion notched for the passage of the feed roller teeth and seed. This combination is of advantage, for the reason that the teeth of the feed roller in passing through the notches of the right hand plate 9, as seen in Fig. 1, will gradually feed the seed down onto the plate 19, the seed tending to accumulate on the plate 19. It is to be observed, that as the feed roller or cylinder rotates, the teeth or fingers thereof will move over the free portion of the plate 19, and over the top of the crushing roller 13, so as to gradually work the seed over the roller 13 between the two crushing rollers. Thus, the seed is fed downwardly by the feed roller onto the plate 19, from whence it is gradually delivered over the crushing roller 13 to be crushed and delivered.

Having described the invention, what I claim as new and desire to secure by Letters Patent is:—

A seed crusher embodying a frame, a pair of horizontal juxtaposed crushing rollers carried thereby, a slightly inclined plate carried by the frame and having its free portion resting on top of one crushing roller, a toothed feed roller carried by the frame above the free portion of the said plate and coöperating with the said plate and roller, and an inclined plate carried by the frame above the aforesaid plate and having its lower portion notched for the passage of the feed roller teeth.

In testimony that I claim the foregoing as my own, I have hereto affixed my signature in the presence of two witnesses.

JOHN A. GARDNER.

Witnesses:
C. S. CORR,
N. O. WARREN.

---

Copies of this patent may be obtained for five cents each, by addressing the "Commissioner of Patents, Washington, D. C."